US012767028B2

(12) United States Patent
Jeon et al.

(10) Patent No.: US 12,767,028 B2
(45) Date of Patent: Oct. 20, 2026

(54) DEPLOYABLE NECK PILLOW FOR A VEHICLE AND METHODS OF USE THEREOF

(71) Applicant: GM GLOBAL TECHNOLOGY OPERATIONS LLC, Detroit, MI (US)

(72) Inventors: Minseok Jeon, Gimpo-si (KR); Sungjin Kim, Incheon (KR); Subin Cho, Bupyeong-gu (KR); Gerard A. Brinas, Sterling Heights, MI (US)

(73) Assignee: GM GLOBAL TECHONOLGY OPERATIONS LLC, Detroit, MI (US)

( * ) Notice: Subject to any disclaimer, the term of this patent is extended or adjusted under 35 U.S.C. 154(b) by 127 days.

(21) Appl. No.: 19/034,998

(22) Filed: Jan. 23, 2025

(65) Prior Publication Data

US 2026/0208649 A1 Jul. 23, 2026

(51) Int. Cl.

| | |
|---|---|
| ***B60R 21/02*** | (2006.01) |
| ***B60N 2/66*** | (2006.01) |
| ***B60N 2/865*** | (2018.01) |
| ***B60N 2/874*** | (2018.01) |
| ***B60N 2/90*** | (2018.01) |
| ***B60R 21/207*** | (2006.01) |

(52) U.S. Cl.
CPC ............... *B60N 2/976* (2018.02); *B60N 2/66* (2013.01); *B60N 2/865* (2018.02); *B60N 2/874* (2018.02)

(58) Field of Classification Search
CPC .... B60N 2002/899; B60N 2/80; B60N 2/809; B60N 2/885
See application file for complete search history.

(56) References Cited

U.S. PATENT DOCUMENTS 4,946,191 A * 8/1990 Putsch ..................... B60N 2/80 280/730.2
10,899,307 B2 * 1/2021 Lin ..................... B60N 2/0268
11,820,309 B1 * 11/2023 Faruque ................ B60R 21/207
2018/0178696 A1 * 6/2018 Dexter ................... B60N 2/829
2019/0160984 A1 * 5/2019 Hickman Guevara ..................... B60N 2/809
2020/0223340 A1 * 7/2020 Nasca .................... B60N 2/879
2023/0191973 A1 * 6/2023 Migneco ................ B60N 2/976 601/148
2026/0208649 A1 * 7/2026 Jeon ..................... B60N 2/976

FOREIGN PATENT DOCUMENTS

DE 102010056198 A1 8/2011

* cited by examiner

*Primary Examiner* — Shin H Kim
(74) *Attorney, Agent, or Firm* — Ingrassia Fisher & Lorenz, LLP | IFL

(57) ABSTRACT

Vehicle seats having deployable neck pillows and methods for support in occupant's neck are provided. The neck pillows include an inflatable body secured to a seatback of the seat and disposed within a recess thereof, an inlet between an internal cavity of the inflatable body and a source of a pressurized fluid, and an outlet between the internal cavity of the inflatable body and a source of a suction force. The inflatable body is configured to, in response to receiving the pressurized fluid, inflate and expand from the recess to an extent sufficient to at least partially support the neck of the occupant while the occupant is sitting on a seat cushion of the seat and configured to, in response to the suction force being applied to the outlet, deflate and contract to an extent sufficient to be disposed entirely within the recess of the seatback.

20 Claims, 7 Drawing Sheets

DEPLOYABLE NECK PILLOW FOR A VEHICLE AND METHODS OF USE THEREOF

INTRODUCTION

The technical field generally relates to vehicle seats, and more particularly relates to vehicle seats that include a deployable neck pillow for supporting an occupant's neck.

Contemporary automobiles offer a range of amenities designed to enhance the comfort of their occupants. Examples of these features include adjustable seats that can be customized to accommodate specific occupants, including adjustments for seat height, recline angle, lumbar support, and headrest height.

However, there is an ongoing desire to provide systems and methods capable of further promoting occupant comfort while in a vehicle. Furthermore, other desirable features and characteristics of the present disclosure will become apparent from the subsequent detailed description and the appended claims, taken in conjunction with the accompanying drawings and the foregoing introduction.

SUMMARY

A method is provided for supporting a neck of an occupant of a vehicle. In one example, the method includes providing a deployable neck pillow having an inflatable body disposed within a recess of a seatback of a seat in a vehicle, directing, with a pneumatic actuator system within the vehicle, a pressurized fluid into an internal cavity of the inflatable body via an inlet thereof to cause the inflatable body to inflate and expand from the recess to an extent sufficient to at least partially support a neck of an occupant while the occupant is sitting on a seat cushion of the seat, and producing, with the pneumatic actuator system, a suction force on the internal cavity of the inflatable body via an outlet thereof to cause the inflatable body to deflate and contract to an extent sufficient to be disposed entirely within the recess of the seatback.

In various examples, the inflatable body may include an inner cushion and an outer cushion. In such examples, directing the pressurized fluid into the internal cavity of the inflatable body may include directing the pressurized fluid to first fully inflate the inner cushion and then directing the pressurized fluid to inflate the outer cushion. Similarly, producing the suction force on the internal cavity of the inflatable body may include producing the suction force to first fully deflate the outer cushion and then producing the suction force to deflate the inner cushion.

In various examples, the method may include restricting, with a one-way valve inlet, flow of the pressurized fluid from the inner cushion to the outer cushion while directing the pressurized fluid into the internal cavity of the inflatable body until the inner cushion is fully inflated, and restricting, with a one-way valve outlet, flow of the pressurized fluid from the inner cushion to the outer cushion producing the suction force on the internal cavity of the inflatable body until the outer cushion is fully deflated.

In various examples, the method may include concealing the inflatable body with a cover panel while the inflatable body is disposed within the recess of the seatback. In such examples, directing the pressurized fluid into the internal cavity of the inflatable body may include directing the pressurized fluid to applying a force against the cover panel with the inflatable body sufficient to pivot the cover panel about a flexible hinge thereof and thereby provide access to the recess of the seatback.

In various examples, the deployable neck pillow may include a plurality of frame members disposed within the internal cavity of the inflatable body that are each coupled to a frame hinge at first ends thereof. In such examples, directing the pressurized fluid into the internal cavity of the inflatable body may include directing the pressurized fluid between each of the plurality of frame members to cause the plurality of frame members to pivot about the frame hinge and thereby separate second ends of the plurality of frame members from contact with each other. The method may include structurally supporting the inflatable body with the plurality of frame members while the inflatable body is inflated with the pressurized fluid.

In various examples, the method may include restricting the inflation and expansion of the inflatable body with tether members and promoting deflation and contraction of the inflatable body with biasing members.

In various examples, the method may include preventing inflation and expansion of the inflatable body when the occupant is driving the vehicle.

In various examples, the method may include operating the pneumatic actuator system with a massage system or a lumbar support system of the seat.

A deployable neck pillow is provided for a seat of a vehicle. In one example, the deployable neck pillow includes an inflatable body secured to a seatback of the seat and disposed within a recess of the seatback, an inlet configured to provide fluidic communication between an internal cavity of the inflatable body and a source of a pressurized fluid, and an outlet configured to provide fluidic communication between the internal cavity of the inflatable body and a source of a suction force. The inflatable body is configured to, in response to receiving the pressurized fluid through the inlet, inflate and expand from the recess to an extent sufficient to at least partially support a neck of an occupant while the occupant is sitting on a seat cushion of the seat and configured to, in response to the suction force being applied to the outlet, deflate and contract to an extent sufficient to be disposed entirely within the recess of the seatback.

In various examples, the inflatable body may include an inner cushion and an outer cushion, wherein the inner cushion is configured to, in response to receiving the pressurized fluid, fully inflate and expand prior to the pressurized fluid entering the outer cushion, wherein the outer cushion is configured to, in response to the suction force being applied thereto, fully deflate and contract prior to the pressurized fluid exiting the inner cushion.

In various examples, the deployable neck pillow may include a one-way valve inlet configured to restrict flow of the pressurized fluid from the inner cushion to the outer cushion while the inner cushion is receiving the pressurized fluid until the inner cushion is fully inflated, and a one-way valve outlet configured to restrict flow of the pressurized fluid from the inner cushion to the outer cushion while the suction force is being applied to the outer cushion until the outer cushion is fully deflated.

In various examples, the deployable neck pillow may include a cover panel configured to cover the recess and conceal the inflatable body while the inflatable body is disposed within the recess of the seatback, and configured to open and provide access to the recess by pivoting about a flexible hinge thereof in response to a force being applied against the cover panel with the inflatable body when the inflatable body is receiving the pressurized fluid.

In various examples, the seat may not be a driver's seat and the cover panel may have a concave shape to reduce a likelihood that the cover panel will contact the occupant when the cover panel opens to allow the inflatable body to deploy from the recess.

In various examples, the deployable neck pillow may include a plurality of frame members disposed within the internal cavity of the inflatable body that are each coupled to a frame hinge a first ends thereof. In such examples, the plurality of frame members may be configured to receive the pressurized fluid therebetween while the inflatable body is receiving the pressurized fluid to cause the plurality of frame members to pivot about the frame hinge and thereby separate second ends of the plurality of frame members from contact with each other. The plurality of frame members may be configured to structurally support the inflatable body while the inflatable body is inflated with the pressurized fluid.

In various examples, the deployable neck pillow may include tether members configured to restrict the inflation and expansion of the inflatable body, and biasing members configured to promote deflation and contraction of the inflatable body.

In various examples, the source of the pressurized fluid and the source of the suction force may be a pneumatic actuator system, and the pneumatic actuator system may be configured to prevent inflation and expansion of the inflatable body when the occupant is driving the vehicle. In such examples, the pneumatic actuator system may be operably coupled with a massage system or a lumbar support system of the seat.

A vehicle is provided that, in one example, includes a seat having a seat cushion configured to support an occupant sitting thereon and a seatback configured to support a back of the occupant while the occupant is sitting on the seat cushion, a deployable neck pillow secured to the seatback and having an inflatable body disposed within a recess of the seatback, and a pneumatic actuator system fluidically coupled with the deployable neck pillow and configured to direct a pressurized fluid into an internal cavity of the inflatable body via an inlet thereof to cause the inflatable body to inflate and expand from the recess to an extent sufficient to support a neck of the occupant while the occupant is sitting on the seat cushion of the seat, and produce a suction force on the internal cavity of the inflatable body via an outlet thereof to cause the inflatable body to deflate and contract to an extent sufficient to be disposed entirely within the recess of the seatback.

In various examples, the inflatable body of the deployable neck pillow may include an inner cushion and an outer cushion, wherein the inner cushion is configured to, in response to receiving the pressurized fluid, fully inflate and expand prior to the pressurized fluid entering the outer cushion, wherein the outer cushion is configured to, in response to the suction force being applied thereto, fully deflate and contract prior to the pressurized fluid exiting the inner cushion, wherein the deployable neck pillow includes a one-way valve inlet configured to restrict flow of the pressurized fluid from the inner cushion to the outer cushion while the inner cushion is receiving the pressurized fluid until the inner cushion is fully inflated, and a one-way valve outlet configured to restrict flow of the pressurized fluid from the inner cushion to the outer cushion while the suction force is being applied to the outer cushion until the outer cushion is fully deflated.

In various examples, the deployable neck pillow may include a cover panel configured to cover the recess and conceal the inflatable body while the inflatable body is disposed within the recess of the seatback, and configured to open and provide access to the recess by pivoting about a flexible hinge thereof in response to a force being applied against the cover panel with the inflatable body when the inflatable body is receiving the pressurized fluid, a plurality of frame members disposed within the internal cavity of the inflatable body that are each coupled to a frame hinge a first ends thereof, wherein the plurality of frame members are configured to receive the pressurized fluid therebetween while the inflatable body is receiving the pressurized fluid to cause the plurality of frame members to pivot about the frame hinge and thereby separate second ends of the plurality of frame members from contact with each other, wherein the plurality of frame members are configured to structurally support the inflatable body while the inflatable body is inflated with the pressurized fluid, tether members configured to restrict the inflation and expansion of the inflatable body, and biasing members configured to promote deflation and contraction of the inflatable body.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding introduction or the following detailed description.

Figure 1:
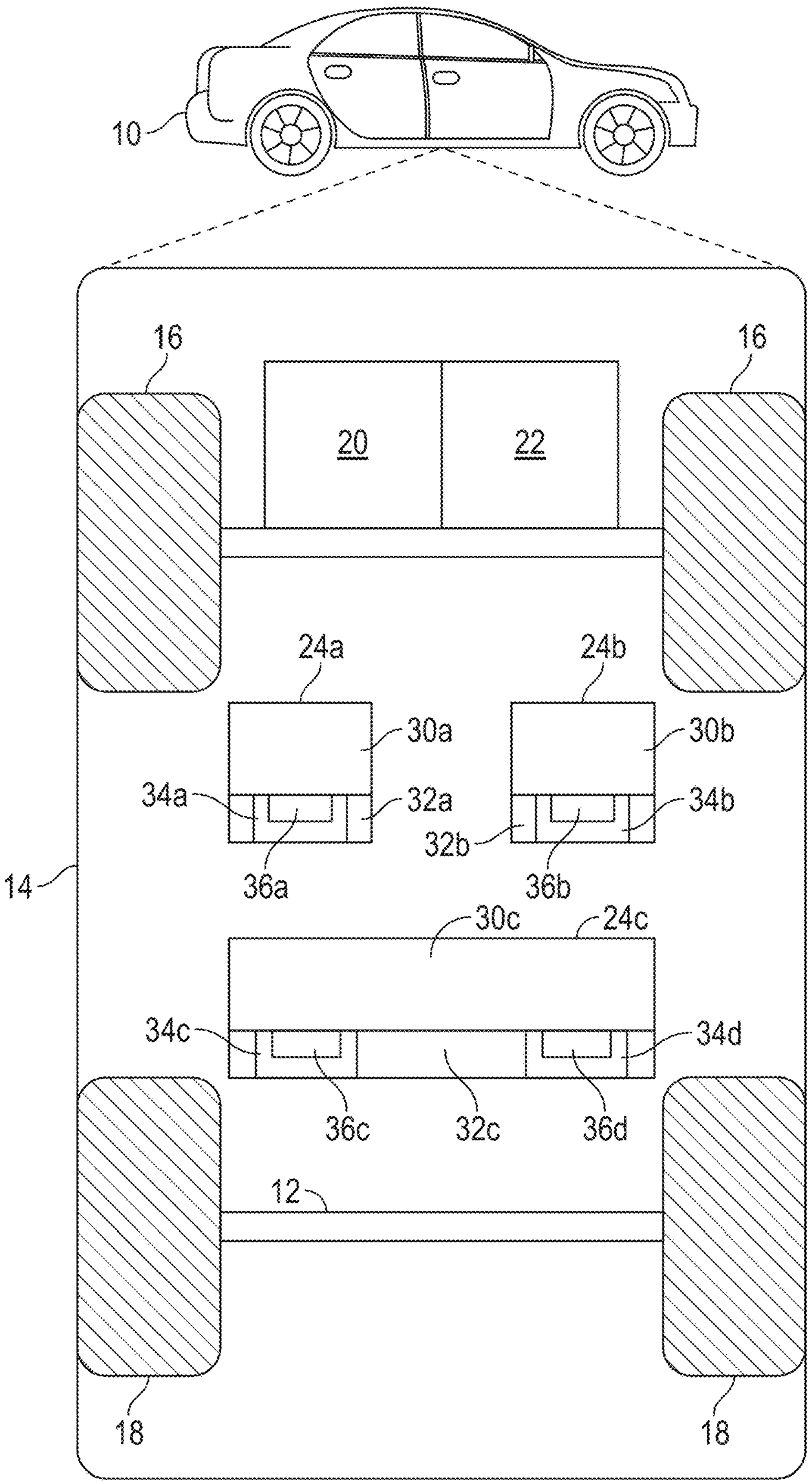
FIG. 1 is a functional block diagram of a vehicle having seats with deployable neck pillows in accordance with an example.

FIG. 1 illustrates a vehicle 10, according to an example. The vehicle 10 includes one or more seats having a deployable neck pillow for supporting a neck of an occupant of the vehicle 10. In various examples, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles or mobile platforms in certain examples.

As depicted in FIG. 1, the exemplary vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16, 18 are each rotationally coupled to the chassis 12 near a respective corner of the body 14.

The vehicle 10 further includes a propulsion system 20, a transmission system 22, and seats 24 (identified as seats 24*a*, 24*b*, 24*c* in FIG. 1) that each include at least one deployable neck pillow 36. The propulsion system 20 includes an engine and/or motor such as an internal combustion engine (e.g., a gasoline or diesel fueled combustion engine), an electric motor (e.g., a 3-phase AC motor), or a hybrid system that includes more than one type of engine and/or motor. The transmission system 22 is configured to transmit power from the propulsion system 20 to the wheels 16, 18 according to selectable speed ratios. According to various examples, the transmission system 22 may include a step-ratio automatic transmission, a continuously-variable transmission, or other appropriate transmission.

The seats 24 may include front seats 24*a*, 24*b* and one or more rear seats 24*c* each configured to support an occupant of the vehicle 10 sitting thereon. In this example, the vehicle 10 includes two rows of seats; however, the vehicle 10 may include one or more additional rows of seats such as a third row. Each of the seats 24 may include a frame (not shown) secured to a floor of the vehicle 10, a seat base or seat cushion 30 (identified as 30*a*-30*c* in FIG. 1) coupled to the frame, a seatback 32 (identified as 32*a*-32*c* in FIG. 1) secured at a lower end thereof to the seat cushion 30 and/or the frame, and a headrest 34 (identified as 34*a*-34*d*) secured to an upper end of the seatback 32. The seat cushion 30 may be configured to support a rear and/or thighs of the occupant seated thereon, the seatback 32 may be configured to support the occupant's back while seated on the seat cushion 30, and the headrest 34 may be configured to support the occupant's head. The seats 24 may include various components that provide for adjustment thereof, such as systems for adjusting a height of the seats 24 relative to the vehicle floor, a recline angle of the seatback 32, lumbar support, and a height of the headrest 34 relative to an upper end of the seatback 32.

Figure 2:
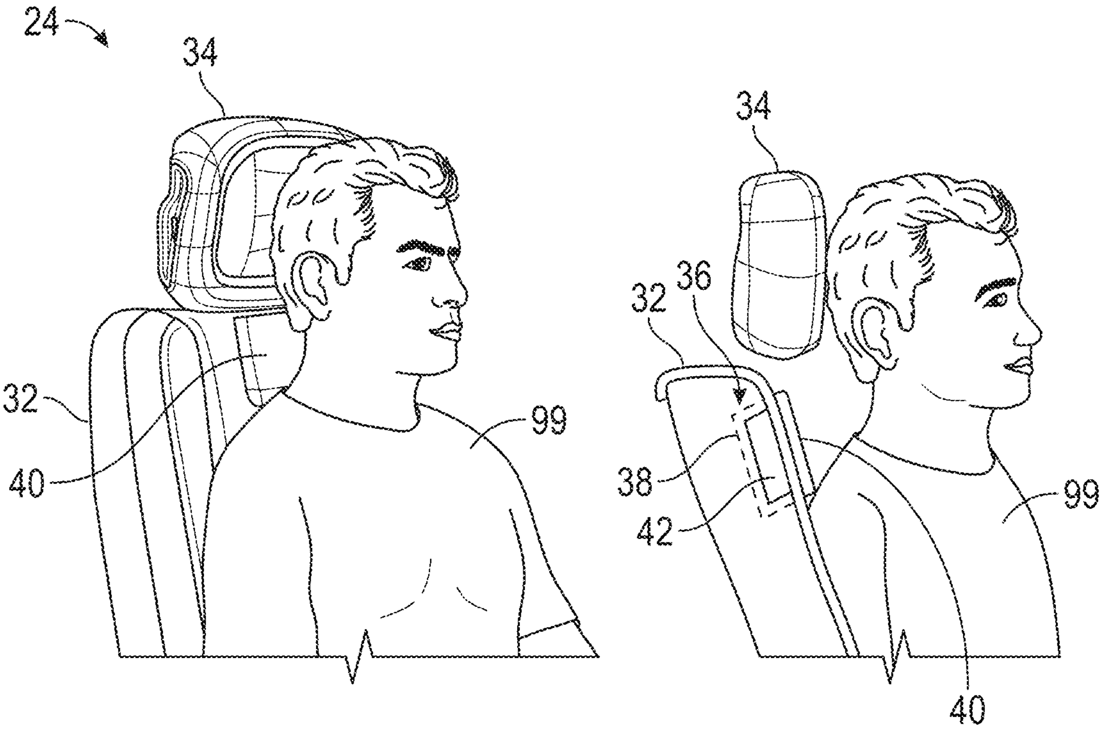
FIG. 2 includes perspective and side views representing an occupant sitting in a seat of the vehicle of FIG. 1 with the deployable neck pillow in a stowed configuration in accordance with an example.
Figure 3:
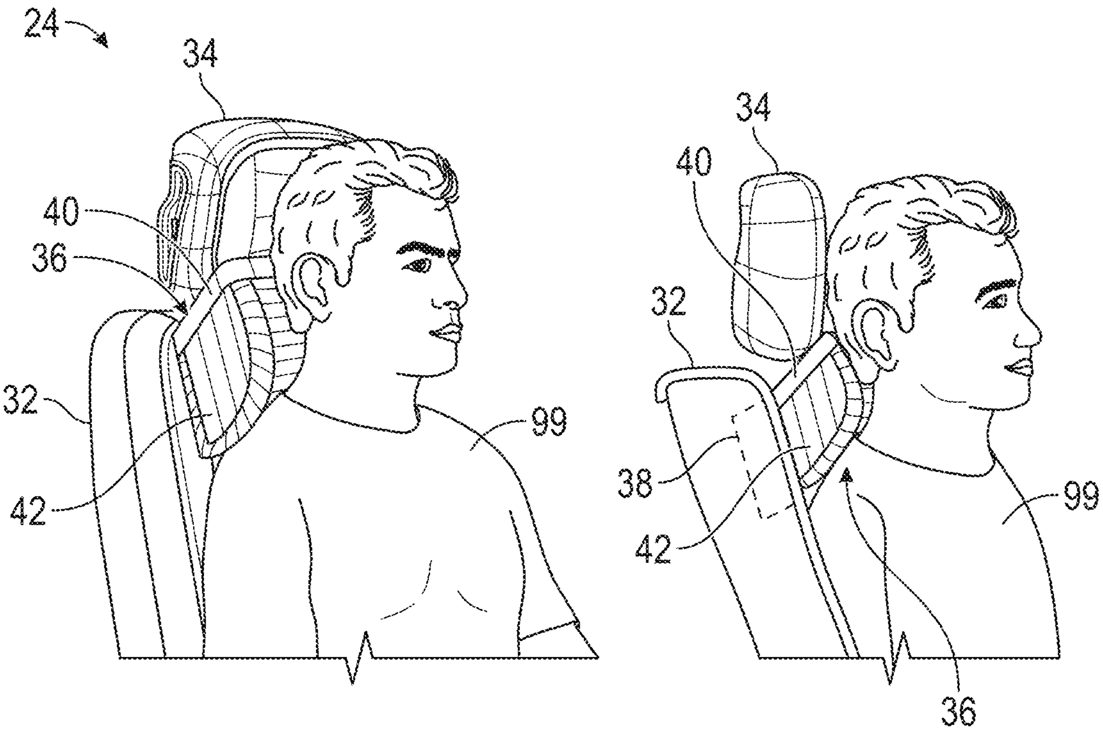
FIG. 3 includes perspective and side views representing an occupant sitting in the seat of the vehicle of FIG. 1 with the deployable neck pillow in a deployed configuration in accordance with an example.
Figure 4:
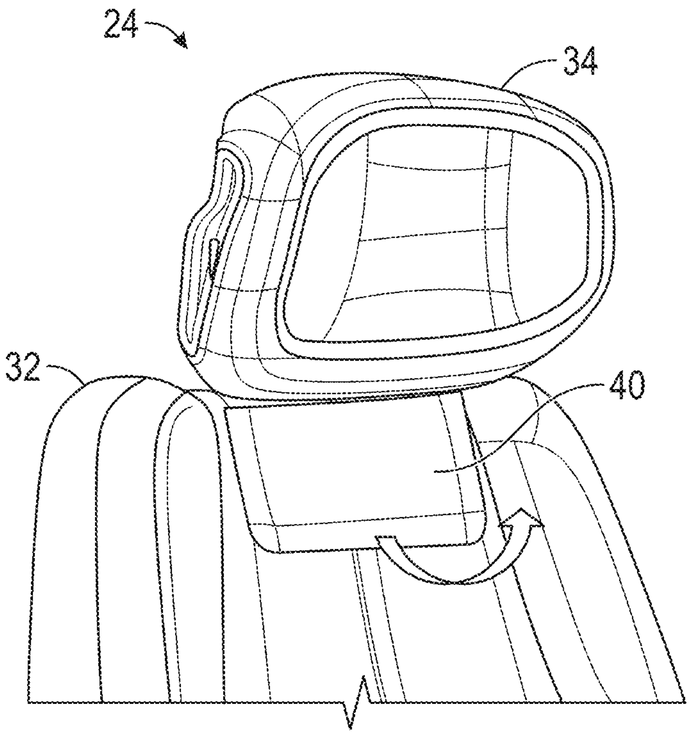
FIGS. 4 and 5 include perspective views of the seat of FIGS. 2 and 3 with the deployable neck pillow in stowed and deployed configurations, respectively, in accordance with an example.
Figure 5:
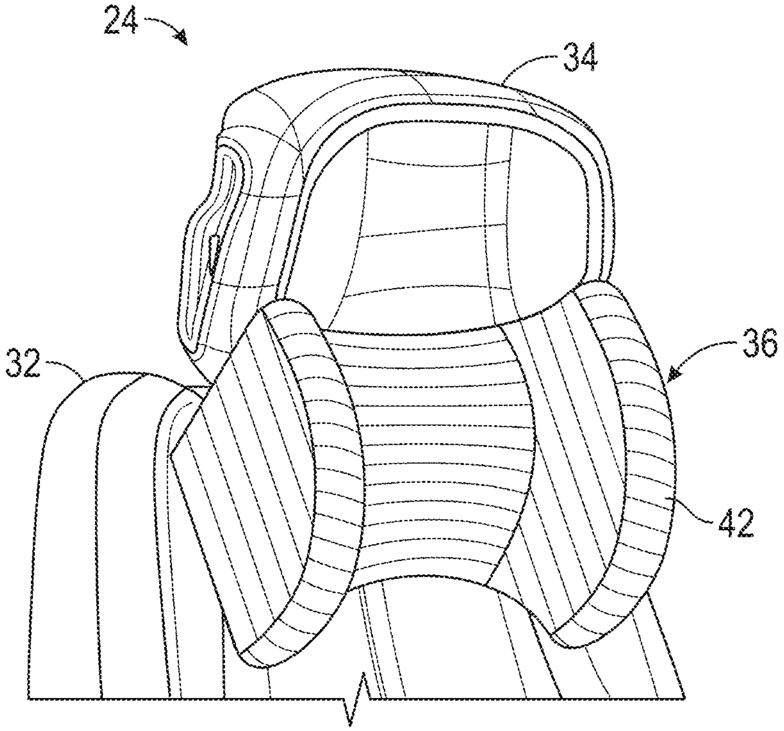

Each of the seats 24 include the deployable neck pillow 36 (identified as 36*a*-36*d* in FIG. 1) disposed at least partially within a recess (38 in FIG. 2) in the seatback 32. FIGS. 2-5 represent partial, perspective views of one of the seats 24 with the deployable neck pillow 36 stowed within the seatback 32 (FIGS. 2 and 4) and deployed from the seatback 32 (FIGS. 3 and 5). FIGS. 2 and 3 represent an occupant 99 sitting on the seat 24. In general, a source of a pressurized fluid may be fluidically coupled with the deployable neck pillow 36 and configured to direct a pressurized fluid into an internal cavity (68 and 70 of FIGS. 9 and 10) of an inflatable body 42 of the deployable neck pillow 36 to cause the inflatable body 42 to inflate and expand from the recess 38 to an extent sufficient to support a neck of the occupant 99 while the occupant 99 is sitting on the seat cushion 30 of the seat 24. Subsequently, a source of a suction force may be used to produce and apply a suction force on the internal cavity 68, 70 of the inflatable body 42 to cause the inflatable body 42 to deflate and contract to an extent sufficient to be disposed entirely within the recess 38 of the seatback 32. For example, the inflatable body 42 may include via an inlet (58 in FIGS. 9 and 10) configured to provide fluidic communication between the internal cavity 68, 70 thereof and the source of the pressurized fluid, and an outlet (60 in FIGS. 9 and 10) configured to provide fluidic communication between the internal cavity 68, 70 thereof and the source of the suction force. In some examples, the source of the pressurized fluid and the source of the suction force may be a pneumatic actuator system 44. The pneumatic actuator system 44 may be one of the various types of pneumatic actuator systems used with existing in-seat massage systems and/or lumbar support systems, and therefore will not be described in detail herein. In some examples, the pneumatic actuator system 44 may be operably coupled with a massage system and/or a lumbar support system of the seat 24. Although not shown, the vehicle 10 may include one or more control devices for operating the deployable neck pillow 36, such as one or more physical push buttons, physical switches, or digital icons of a graphic user interface.

Figure 6:
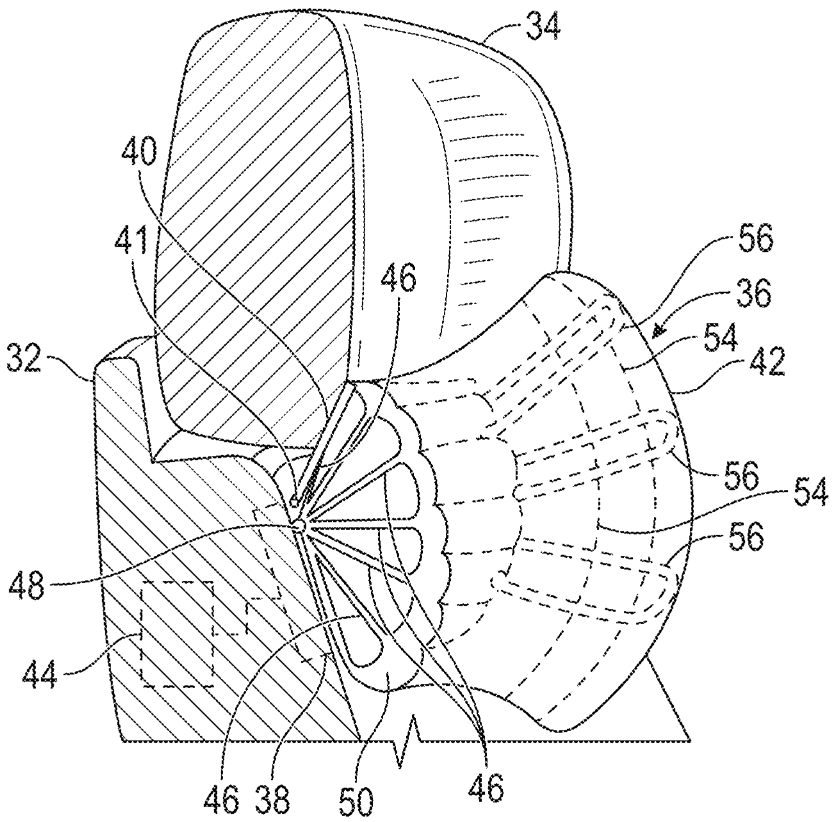
FIG. 6 is a partial, perspective, cross-sectional view of the seat of FIGS. 2-5 with the deployable neck pillow in the deployed configuration in accordance with an example.
Figure 7:
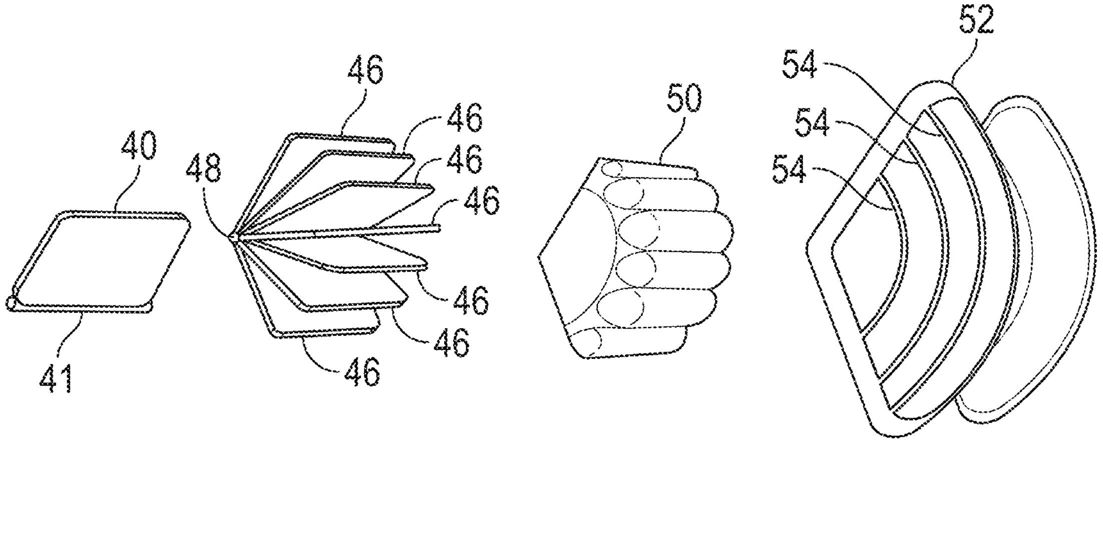
FIG. 7 is an exploded view showing certain components of the deployable neck pillow of FIG. 6 in accordance with an example.

FIGS. 6 and 7 represents various components of the deployable neck pillow 36. FIG. 6 is a partial, perspective, cross-sectional view and FIG. 7 is an exploded view showing certain components in isolation. In these examples, the deployable neck pillow 36 includes a cover panel 40 and an inflatable body 42 that includes a plurality of frame members 46, an inner cushion 50, and an outer cushion 52.

The cover panel 40 is configured to cover the recess 38 and conceal the inflatable body 42 while the inflatable body 42 is disposed within the recess 38 of the seatback 32. As this inflatable body 42 inflates and expands, the cover panel 40 is configured to open and provide access to the recess 38 by pivoting about a cover hinge 41 thereof in response to a force being applied against the cover panel 40 with the inflatable body 42. In some examples, the cover panel 40 may be covered in an exterior material that is the same as an exterior material of the seatback 32. While the cover panel 40 is closed and conceals the recess 38, the exterior surfaces of the cover panel 40 may be flush with or otherwise contoured with adjacent surfaces of the seatback 32 such that the cover panel 40 has little to no effect on the normal usage of the seat 24. While closed, the cover panel 40 may be secured with one or more fasteners (66 in FIG. 8), such as a hook and loop fastener.

The inflatable body 42 may be secured to the seatback 32 of the seat 24 and disposed within the recess 38 of the seatback 32 when not in use. The plurality of frame members 46 are disposed within the internal cavity 68, 70 of the inflatable body 42. Each of the frame members 46 are coupled to and pivotable about a frame hinge 48 at first ends thereof. The inner cushion 50 and the frame members 46 are configured to promote proper inflation of the inflatable body 42 and provide structural support (e.g., firmness) to the inflatable body 42 while the inflatable body 42 is inflated with the pressurized fluid. The outer cushion 52 is configured to support the neck of the occupant 99 and promote comfort thereof. In some examples, the outer cushion 52 may be configured to have an amount of inflation thereof be adjustable to accommodate occupants of various shapes and sizes.

Figure 8:
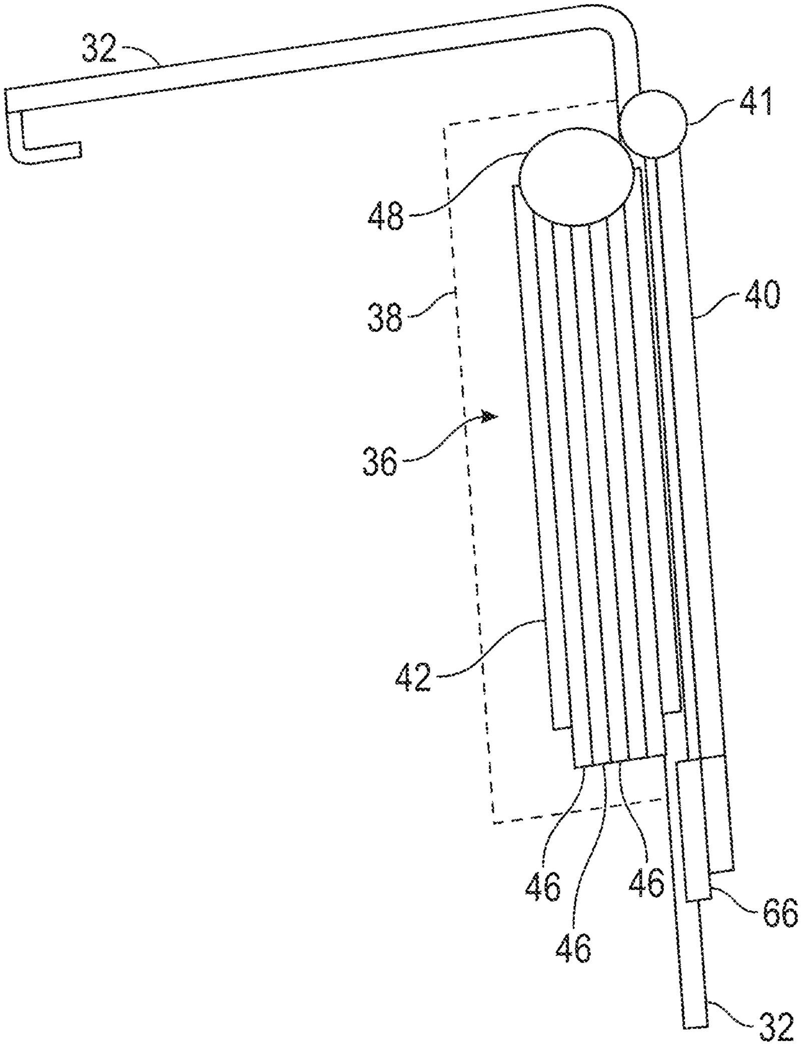
FIGS. 8-10 schematically represent side, cross-sectional views illustrating inflation and expansion of the deployable neck pillow of FIGS. 6 and 7 in accordance with an example.
Figure 10:
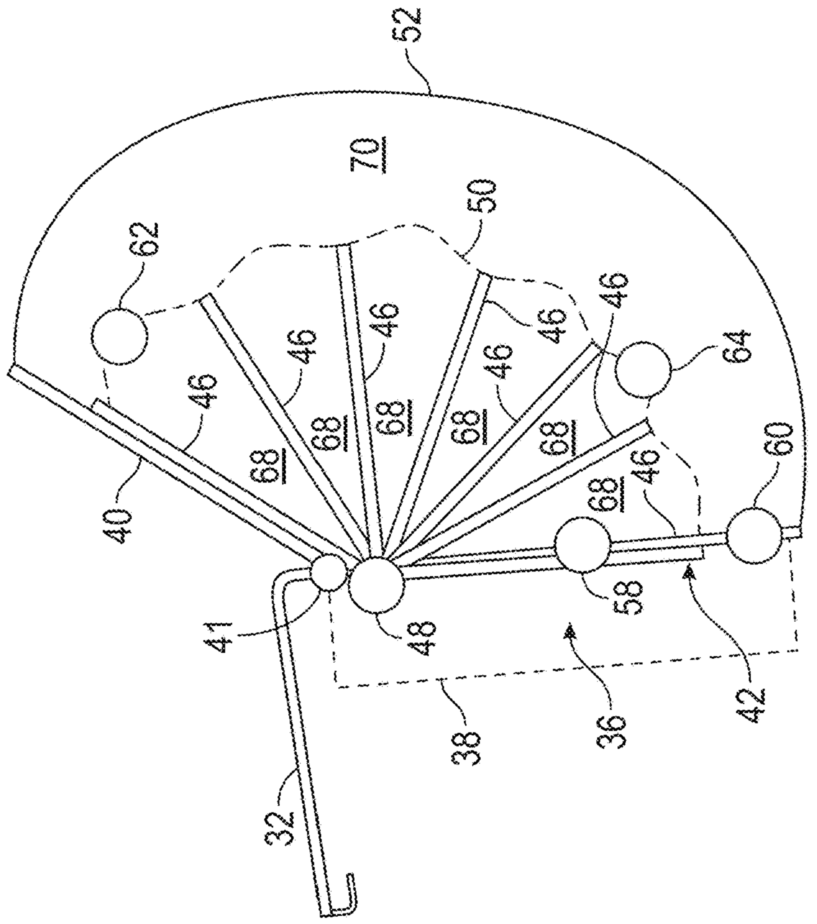
Figure 9:
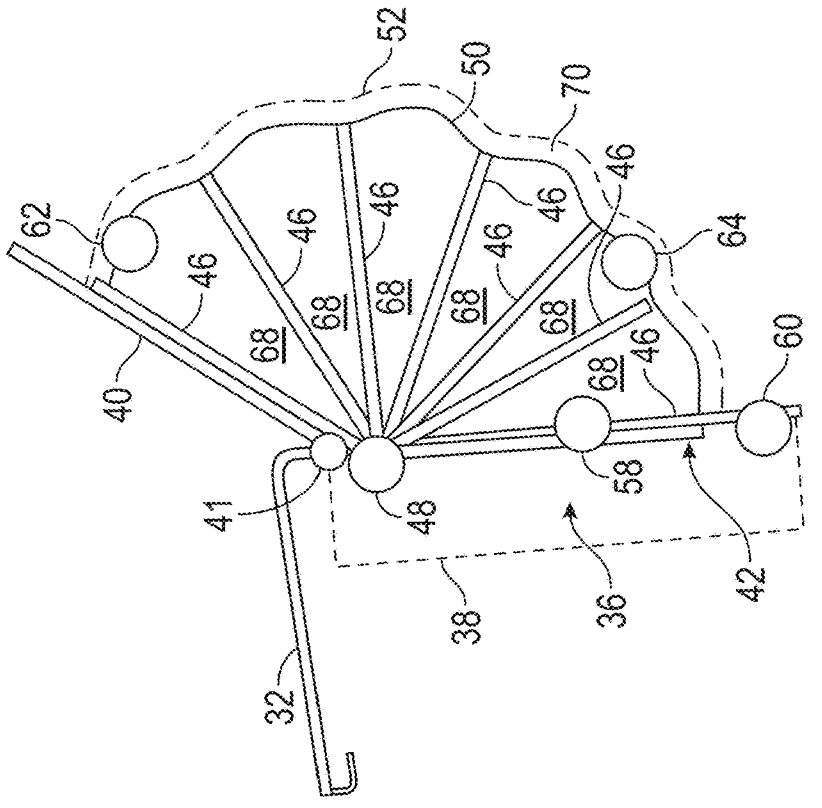

Inflation and deflation of the inflatable body 42 will not be described in more detail with reference to FIGS. 8-10, and with continued reference to FIGS. 1-7. FIG. 8 schematically represents a cross-sectional view of the deployable neck pillow 36 in a stowed configuration with the inflatable body 42 disposed within the recess 38 of the seatback 32 and the cover panel 40 covering an opening to the recess 38. FIGS. 9 and 10 schematically represent cross-sectional views of the deployable neck pillow 36 in partially and fully inflated configurations, respectively.

Referring now to FIG. 9, when the pneumatic actuator system 44 is operated to direct the pressurized fluid into the inflatable body 42, the pressurized fluid enters the first internal cavity 68 of the inner cushion 50 through the inlet 58 causing the inner cushion 50 to inflate and expand. As the inflatable body 42 expands, the inflatable body 42 presses against an inner face of the cover panel 40 causing the cover panel 40 to pivot about the cover hinge 41 allowing the inflatable body 42 to exit the recess 38. As the first internal cavity 68 fills, the pressurized fluid is directed between the frame members 46. This causes the frame members 46 to pivot about the frame hinge 48 and thereby separate second ends of the frame members 46 from contact with each other, that is, the frame members 46 fan out.

In some examples, the inflatable body 42 is configured to fully inflate and expand the inner cushion 50 prior to the pressurized fluid entering the outer cushion 52. In this example, the inflatable body 42 includes a one-way valve inlet 62 configured to restrict flow of the pressurized fluid from the inner cushion 50 to the outer cushion 52 while the inner cushion 50 is receiving the pressurized fluid until the inner cushion 50 is fully inflated. The one-way valve inlet 62 may include a biasing device (e.g., a spring) configured to resist passage of the pressurized fluid through the one-way valve inlet 62 until a threshold pressure is reached within the first internal cavity 68 that is in excess of the pressure necessary to fully inflate and expand the inner cushion 50.

Referring now to FIG. 10, once the inner cushion 50 has fully inflated and expanded, the pressurized fluid may pass through the one-way valve inlet 62 and into a second internal cavity 70 to inflate and expand the outer cushion 52. In some examples, the outer cushion 52 may be fully inflated and expanded, and in other examples the outer cushion 52 may be inflated and expanded to an amount that is less than full but desired for a specific occupant.

The inflatable body 42 may include tether members 54 that are configured to restrict the inflation and expansion of the outer cushion 52. In this manner, the final shape of the outer cushion 52 when inflated may be maintained as intended, such as the hourglass or dog bone shape represented in FIG. 5 having the concave recess in the middle and larger radius ends. The tether members 54 may be flexible to allow for expansion and contraction of the outer cushion 52, but resistant to stretching.

When the occupant is finished with using the deployable neck pillow 36, the pneumatic actuator system 44 may be operated to produce a suction force to remove the pressurized fluid from the inflatable body 42 through the outlet 60 to deflate and contract the inflatable body 42. In some examples, the inflatable body 42 is configured to fully deflate and contract the outer cushion 52 prior to the pressurized fluid exiting the inner cushion 50. In this example, the inflatable body 42 includes a one-way valve outlet 64 configured to restrict flow of the pressurized fluid from the inner cushion 50 to the outer cushion 52 while the suction force is being applied to the outer cushion 52 until the outer cushion 52 is fully deflated. The one-way valve outlet 64 may include a biasing device (e.g., a spring) configured to resist passage of the pressurized fluid through the one-way valve outlet 64 until a threshold pressure is reached within the second internal cavity 70 that is in excess of the pressure necessary to fully deflate and contract the outer cushion 52.

In some examples, the inflatable body 42 may include biasing members 56 configured to promote proper deflation and contraction of the outer cushion 52 to ensure that the inflatable body 42 returns to the recess 38 in its entirety. In this manner, the outer cushion 52 may be biased towards the inner cushion 50 when deflated, rather than hanging due to gravity, and thereby reduces a likelihood of the outer cushion 52 interfering with the closure of the cover panel 40. The biasing members 56 may be flexible and stretchable to allow for expansion of the outer cushion 52. That is, the biasing members 56 may elastically deform to allow inflation of the outer cushion 52, and upon deflation of the outer cushion 52, the biasing members 56 may recover the elastic deformation, return to their original size, and thereby pull the outer cushion 52 toward the inner cushion 50.

After the outer cushion 52 is fully deflated (e.g., FIG. 9), the pressurized fluid may be removed from the first internal cavity 68 via the one-way valve outlet 64 to deflate and contract the inner cushion 50. As the inner cushion 50 deflates, the frame members 46 pivot about the frame hinge 48 until, in some examples, faces of adjacent ones of the frame members 46 contact each other. As the inner cushion 50 deflates and contracts, the inflatable body 42 returns to the recess 38 and the cover panel 40 is pivoted about the cover hinge 41 to eventually cover the opening to the recess 38 and thereby again conceal the inflatable body 42 (e.g., FIG. 8).

Figure 11:
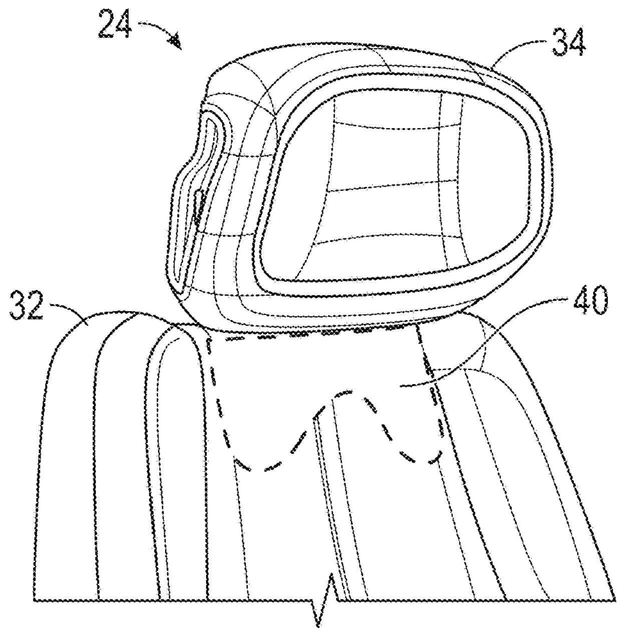
FIG. 11 is a perspective view of a seat of a vehicle with a deployable neck pillow in stowed configuration in accordance with an example.

The specific structure and operation of the deployable neck pillow 36 may be different for each of the seats 24. For example, the pneumatic actuator system 44 may be configured to prevent inflation and expansion of the inflatable body 42 when the occupant of the seat 24 is driving the vehicle 10, that is, the deployable neck pillow 36 of the driver's seat (e.g., seat 24*a* in FIG. 1) may not function while the vehicle 10 is operating or while the transmission is in drive. In contrast, other seats 24 of the vehicle 10 that have non-driving occupants sitting thereon (e.g., seats 24*b*, 24*c*) may be operable even while the vehicle 10 is being driven. As another example, the cover panel 40 may have various shapes to accommodate specific occupants. For example, seats 24 of the vehicle 10 that have non-driving occupants sitting thereon (e.g., seats 24*b*, 24*c*) may include the cover panel 40 having a concave shape along a lower edge thereof to reduce a likelihood that the cover panel 40 will contact the occupant when the cover panel 40 opens to allow the inflatable body 42 to deploy from the recess 38 (e.g., FIG. 11).

Figure 12:
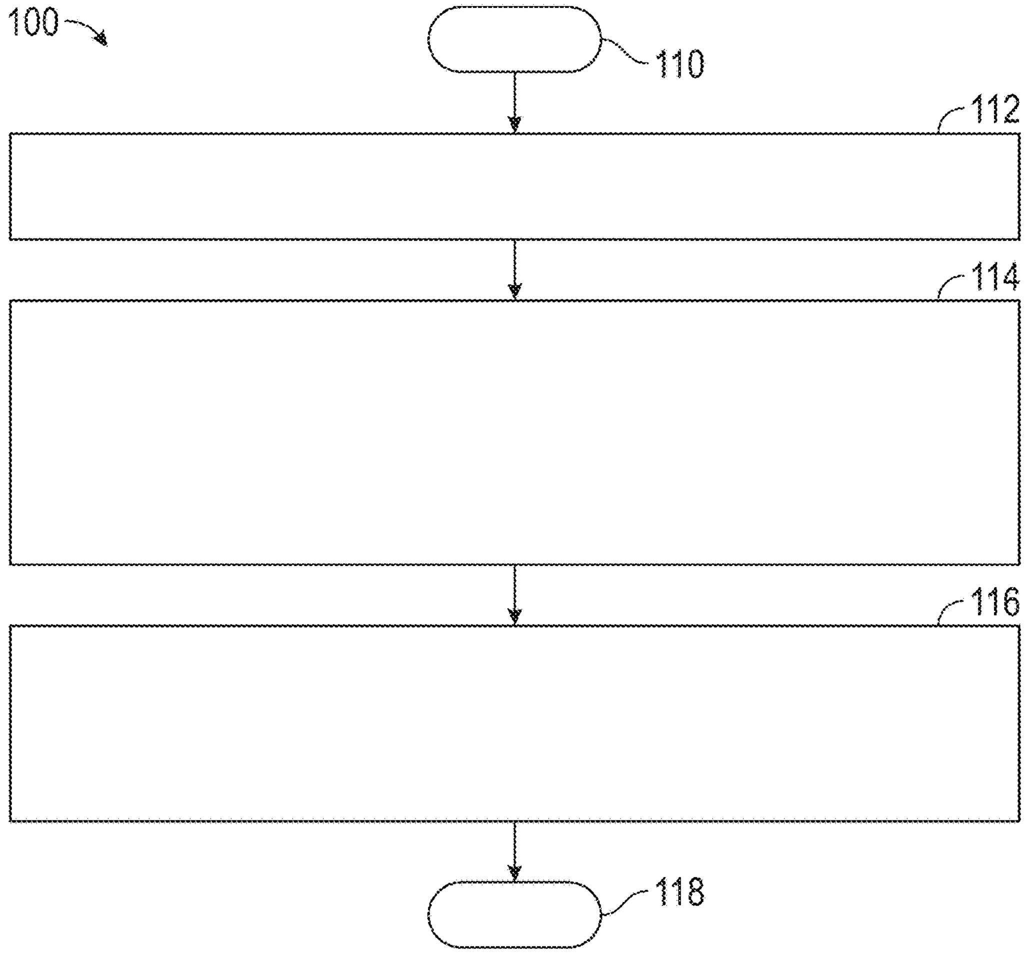
FIG. 12 is a flowchart illustrating a method for supporting a neck of an occupant of a vehicle in accordance with an example.

With reference now to FIG. 12 and with continued reference to FIGS. 1-11, a flowchart provides a method 100 for supporting a neck of a passenger of a vehicle, in accordance with various examples. As can be appreciated in light of the disclosure, the order of operation within the method 100 is not limited to the sequential execution as illustrated in FIG. 12, but may be performed in one or more varying orders as applicable and in accordance with the present disclosure.

In one example, the method 100 may start at 110. At 112, the method 100 may include providing a deployable neck pillow having an inflatable body disposed within a recess of a seatback of a seat in a vehicle. At 114, the method 100 may include directing, with a pneumatic actuator system within the vehicle, a pressurized fluid into an internal cavity of the inflatable body via an inlet thereof to cause the inflatable body to inflate and expand from the recess to an extent sufficient to at least partially support a neck of an occupant while the occupant is sitting on a seat cushion of the seat. At 116, the method 100 may include producing, with the pneumatic actuator system, a suction force on the internal cavity of the inflatable body via an outlet thereof to cause the inflatable body to deflate and contract to an extent sufficient to be disposed entirely within the recess of the seatback. The method 100 may end at 118.

The systems and methods disclosed herein provide various benefits over certain existing systems and methods. For example, passengers in vehicles who, for example, desire to recline and rest in their seats may use external neck pillows or additional seat attachments to provide neck support. While these accessories can provide some relief, they may come with notable drawbacks. For instance, they require dedicated storage space when not in use, must be installed separately, and can be cumbersome to attach and detach, making them less convenient for regular use. In contrast, the deployable neck pillows disclosed herein may provide stable and comfortable neck support with improved ergonomics and convenience for the occupant. The deployable neck pillows may be integrated into the seat, thereby avoiding a need to assemble, disassemble, and/or store the device. In some examples, the inflatable body may conform to the occupant's neck with sequential pneumatic inflation (e.g., inner cushion and then outer cushion), providing individualized comfort.

The various components of the deployable neck pillow may include or be formed of various materials including, as examples, certain polymeric materials and natural or synthetic rubber materials.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method, comprising:

providing a deployable neck pillow having an inflatable body disposed within a recess of a seatback of a seat in a vehicle;

directing, with a pneumatic actuator system within the vehicle, a pressurized fluid into an internal cavity of the inflatable body via an inlet thereof to cause the inflatable body to inflate and expand from the recess to an extent sufficient to at least partially support a neck of an occupant while the occupant is sitting on a seat cushion of the seat; and producing, with the pneumatic actuator system, a suction force on the internal cavity of the inflatable body via an outlet thereof to cause the inflatable body to deflate and contract to an extent sufficient to be disposed entirely within the recess of the seatback.

2. The method of claim 1, wherein the inflatable body includes an inner cushion and an outer cushion, wherein directing the pressurized fluid into the internal cavity of the inflatable body includes directing the pressurized fluid to first fully inflate the inner cushion and then directing the pressurized fluid to inflate the outer cushion, wherein producing the suction force on the internal cavity of the inflatable body includes producing the suction force to first fully deflate the outer cushion and then producing the suction force to deflate the inner cushion.

3. The method of claim 2, further comprising:

restricting, with a one-way valve inlet, flow of the pressurized fluid from the inner cushion to the outer cushion while directing the pressurized fluid into the internal cavity of the inflatable body until the inner cushion is fully inflated; and restricting, with a one-way valve outlet, flow of the pressurized fluid from the inner cushion to the outer cushion producing the suction force on the internal cavity of the inflatable body until the outer cushion is fully deflated.

4. The method of claim 1, further comprising concealing the inflatable body with a cover panel while the inflatable body is disposed within the recess of the seatback, wherein directing the pressurized fluid into the internal cavity of the inflatable body includes directing the pressurized fluid to apply a force against the cover panel with the inflatable body sufficient to pivot the cover panel about a flexible hinge thereof and thereby provide access to the recess of the seatback.

5. The method of claim 1, wherein the deployable neck pillow includes a plurality of frame members disposed within the internal cavity of the inflatable body that are each coupled to a frame hinge at first ends thereof, wherein directing the pressurized fluid into the internal cavity of the inflatable body includes directing the pressurized fluid between each of the plurality of frame members to cause the plurality of frame members to pivot about the frame hinge and thereby separate second ends of the plurality of frame members from contact with each other, the method including structurally supporting the inflatable body with the plurality of frame members while the inflatable body is inflated with the pressurized fluid.

6. The method of claim 1, further comprising restricting the inflation and expansion of the inflatable body with tether members and promoting deflation and contraction of the inflatable body with biasing members.

7. The method of claim 1, further comprising preventing inflation and expansion of the inflatable body when the occupant is driving the vehicle.

8. The method of claim 1, further comprising operating the pneumatic actuator system with a massage system or a lumbar support system of the seat.

9. A deployable neck pillow for a seat of a vehicle, comprising:

an inflatable body secured to a seatback of the seat and disposed within a recess of the seatback;

an inlet configured to provide fluidic communication between an internal cavity of the inflatable body and a source of a pressurized fluid; and an outlet configured to provide fluidic communication between the internal cavity of the inflatable body and a source of a suction force, wherein the inflatable body is configured to, in response to receiving the pressurized fluid through the inlet, inflate and expand from the recess to an extent sufficient to at least partially support a neck of an occupant while the occupant is sitting on a seat cushion of the seat and configured to, in response to the suction force being applied to the outlet, deflate and contract to an extent sufficient to be disposed entirely within the recess of the seatback.

10. The deployable neck pillow of claim 9, wherein the inflatable body includes an inner cushion and an outer cushion, wherein the inner cushion is configured to, in response to receiving the pressurized fluid, fully inflate and expand prior to the pressurized fluid entering the outer cushion, wherein the outer cushion is configured to, in response to the suction force being applied thereto, fully deflate and contract prior to the pressurized fluid exiting the inner cushion.

11. The deployable neck pillow of claim 10, further comprising:

a one-way valve inlet configured to restrict flow of the pressurized fluid from the inner cushion to the outer cushion while the inner cushion is receiving the pressurized fluid until the inner cushion is fully inflated; and a one-way valve outlet configured to restrict flow of the pressurized fluid from the inner cushion to the outer cushion while the suction force is being applied to the outer cushion until the outer cushion is fully deflated.

12. The deployable neck pillow of claim 9, further comprising a cover panel configured to cover the recess and conceal the inflatable body while the inflatable body is disposed within the recess of the seatback, and configured to open and provide access to the recess by pivoting about a flexible hinge thereof in response to a force being applied against the cover panel by the inflatable body when the inflatable body is receiving the pressurized fluid.

13. The deployable neck pillow of claim 12, wherein the seat is not a driver's seat and the cover panel has a concave shape to reduce a likelihood that the cover panel will contact the occupant when the cover panel opens to allow the inflatable body to deploy from the recess.

14. The deployable neck pillow of claim 9, further comprising a plurality of frame members disposed within the internal cavity of the inflatable body that are each coupled to a frame hinge at first ends thereof, wherein the plurality of frame members are configured to receive the pressurized fluid therebetween while the inflatable body is receiving the pressurized fluid to cause the plurality of frame members to pivot about the frame hinge and thereby separate second ends of the plurality of frame members from contact with each other, wherein the plurality of frame members are configured to structurally support the inflatable body while the inflatable body is inflated with the pressurized fluid.

15. The deployable neck pillow of claim 9, further comprising:

tether members configured to restrict the inflation and expansion of the inflatable body; and biasing members configured to promote deflation and contraction of the inflatable body.

16. The deployable neck pillow of claim 9, wherein the source of the pressurized fluid and the source of the suction force is a pneumatic actuator system, and the pneumatic actuator system is configured to prevent inflation and expansion of the inflatable body when the occupant is driving the vehicle.

17. The deployable neck pillow of claim 16, wherein the pneumatic actuator system is operably coupled with a massage system or a lumbar support system of the seat.

18. A vehicle, comprising:

a seat having a seat cushion configured to support an occupant sitting thereon and a seatback configured to support a back of the occupant while the occupant is sitting on the seat cushion;

a deployable neck pillow secured to the seatback and having an inflatable body disposed within a recess of the seatback; and a pneumatic actuator system fluidically coupled with the deployable neck pillow and configured to:

direct a pressurized fluid into an internal cavity of the inflatable body via an inlet thereof to cause the inflatable body to inflate and expand from the recess to an extent sufficient to support a neck of the occupant while the occupant is sitting on the seat cushion of the seat; and produce a suction force on the internal cavity of the inflatable body via an outlet thereof to cause the inflatable body to deflate and contract to an extent sufficient to be disposed entirely within the recess of the seatback.

19. The vehicle of claim 18, wherein the inflatable body includes an inner cushion and an outer cushion, wherein the inner cushion is configured to, in response to receiving the pressurized fluid, fully inflate and expand prior to the pressurized fluid entering the outer cushion, wherein the outer cushion is configured to, in response to the suction force being applied thereto, fully deflate and contract prior to the pressurized fluid exiting the inner cushion, wherein the deployable neck pillow includes a one-way valve inlet configured to restrict flow of the pressurized fluid from the inner cushion to the outer cushion while the inner cushion is receiving the pressurized fluid until the inner cushion is fully inflated, and a one-way valve outlet configured to restrict flow of the pressurized fluid from the inner cushion to the outer cushion while the suction force is being applied to the outer cushion until the outer cushion is fully deflated.

20. The vehicle of claim 18, wherein the deployable neck pillow includes:

a cover panel configured to cover the recess and conceal the inflatable body while the inflatable body is disposed within the recess of the seatback, and configured to open and provide access to the recess by pivoting about a flexible hinge thereof in response to a force being applied against the cover panel by the inflatable body when the inflatable body is receiving the pressurized fluid;

a plurality of frame members disposed within the internal cavity of the inflatable body that are each coupled to a frame hinge at first ends thereof, wherein the plurality of frame members are configured to receive the pressurized fluid therebetween while the inflatable body is receiving the pressurized fluid to cause the plurality of frame members to pivot about the frame hinge and thereby separate second ends of the plurality of frame members from contact with each other, wherein the plurality of frame members are configured to structurally support the inflatable body while the inflatable body is inflated with the pressurized fluid;

tether members configured to restrict the inflation and expansion of the inflatable body; and biasing members configured to promote deflation and contraction of the inflatable body.

* * * * *